W. Sellers.
Tool Holders for Turning Lathes.
N° 36,111. Patented Aug. 5. 1862.
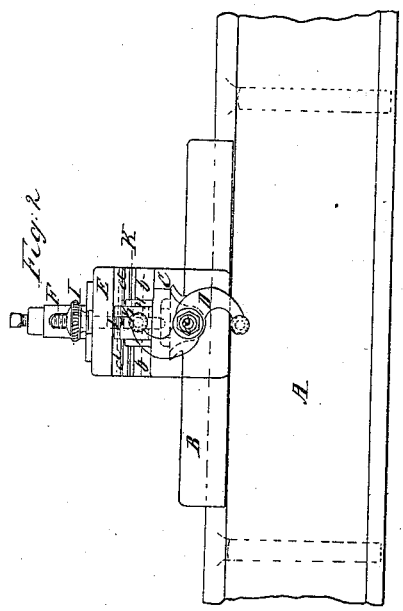
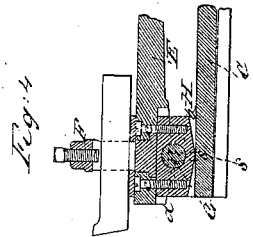
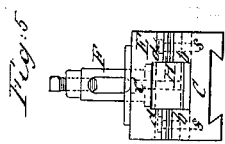
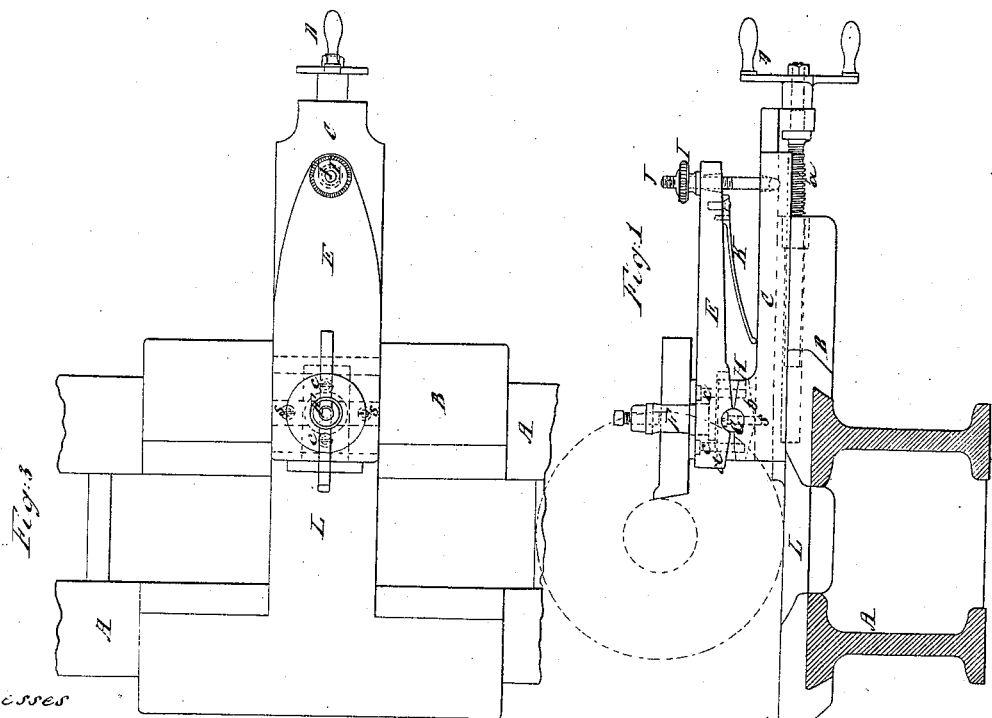

UNITED STATES PATENT OFFICE.

WILLIAM SELLERS, OF PHILADELPHIA, PENNSYLVANIA.

IMPROVEMENT IN TOOL-HOLDERS FOR TURNING-LATHES.

Specification forming part of Letters Patent No. 36,111, dated August 5, 1862.

*To all whom it may concern:*

Be it known that I, WILLIAM SELLERS, of the city of Philadelphia and State of Pennsylvania, have invented a new and useful Improvement in Tool-Holders on Turning-Lathes for Metal; and I do hereby declare the following to be a full and exact description of the same, reference being had to the accompanying drawing, and to the figures and letters of reference marked thereon.

The object of my invention is to provide the tool-holder of lathes with a means of elevating and depressing the cutting-point of the tool after it has been firmly secured in its place without in any way lessening the capacity of the lathe for work above the saddle or bottom rest, and at the same time to have this arrangement of such a character that any play or wear of parts will always be taken up, so that the adjustment may be made at one point and in one direction only.

A mode of elevating and depressing the tool after it has been firmly secured in its place has long been in use, this method being also of such a character as to require adjustment but at one point and in one direction; but this desirable object has heretofore been accomplished at a very considerable sacrifice of room above the bottom rest, thereby greatly limiting the size of the piece that can be turned over the rest. In this method the tool-holder was placed upon a bar which was at right angles to the line of centers of the lathe, and which was capable of a vertical vibration to a limited extent about a center at one end, sliding on the bottom rest, while the other end was supported upon a screw passing through this bar and resting upon the bottom rest, the cutting-point of the tool being between the points of support.

It is evident that by turning the screw in the proper direction the end of the bar which is supported by it will be raised, and to a less extent the cutting-tool; also, reversing the motion of the screw will depress the cutting-tool; and, as the weight of this bar is always resting on the screw, the wear of working parts will always be taken up, and the workman thus feels perfectly certain that by moving the screw he has also moved the point of the tool, and it thus becomes the most delicate and certain mode of regulating the size of the work.

It has been attempted to accomplish the object attained by this long-known method in a variety of ways, so as to avoid the great sacrifice of capacity necessitated by its use; but heretofore all have failed, because all have at the same time sacrificed the delicacy of adjustment which is so prominent a feature in the old method, for although they may adjust at one point, yet they all require an additional movement to take up some lost motion; thus the feeling of certainty is lost to the workman, and it is evident no plan can be successful unless, in adjusting at one point, it shall be also in one direction only to raise the tool, and in the opposite direction only to depress the tool, and that this result must necessarily follow a movement of the adjusting-screw.

My invention consists in arranging a hinge-like attachment of the tool-holder to the cross-slide of the slide-rest of a turning-lathe, the axis of this hinge being placed under or nearly under the center of the tool-post or hold-down for the tool, and so constructed as to be capable of having any lost motion, from wear of imperfection of workmanship, taken up. The cutting-point of the tool projects beyond the axis of this hinge, so that the action of cutting tends to depress the cutting-point of the tool and to elevate the tail end of the hinge; and this is further assisted by a spring under the tail of the hinge acting in the same direction, thus insuring a constant tendency to move upward against a thumb-nut on a screw passing through this tail and preventing it from rising. As this nut acts only in one direction—viz., to hold the tail of the hinge down—any change in its position will produce a corresponding change in the position of the hinge, and consequently of the cutting-point of the tool.

In order that my said invention may be fully understood, I will now proceed more particularly to describe the same, reference being had to the accompanying drawing, making part of this specification, in which the same letters of reference allude to similar parts throughout the several views, and in which—

Figure 1 is a side view of a slide-rest with my improvement attached. Fig. 2 is a front view of the same; Fig. 3, a plan; and Figs. 4 and 5 are detached views of the parts comprised in my invention.

A is the shear or bed of a lathe, upon which slides longitudinally the saddle B. This forms the bottom part of the slide-rest, carrying upon its top, at the front side of the lathe, the cross-slide C, which is operated in the usual manner to bring the tool up to its work by means of a screw, a, and double handle D.

E is the tool-holder or tool-apron, upon the top of which the turning-tool is firmly secured in a tool-post, F.

The tool-holder E is hinged to the cross-slide C in the following peculiar manner: The slide C, which extends only partly across the front half of the saddle B, is, at its inner end upon the top, provided with two opposite projections, b b, in which rests the pin G, where it is firmly secured by means of the screws s s. This pin carries between the projections b b a block, H, which is accurately fitted around the pin G and between the projections b b, but free enough to vibrate vertically upon the pin G. This block is directly underneath the tool-post F, and accurately fitted between the sides of a recess in the under side of the tool-apron E, which is fastened to the block H by the screws c c. The sides of this recess, in which the block H is confined, are formed by downward-projecting cheeks d d, conforming in shape with the projections b b on the cross-slide C, and bearing upon the pin F opposite the projections b b.

While the block H allows a vibrating movement of the tool-apron E upon its fulcrum-pin G, it prevents, by fitting accurately between the projections b b and cheeks d d, any play of the tool-apron E in any other than a vertical plane.

Upon reference to Fig. 4, it will be seen that the depth of the cheeks d d above the center of the fulcrum-pin G is so proportioned to the thickness of block H that by the tightening of the screws c c the projections d d will be brought to their bearing upon the pin G before the top of block H comes in contact with the under side of E.

The pin G being, as it were, firmly secured to the cross-slide C, and the tool-apron E drawn down upon the said pin in the above manner, it will be evident that by this arrangement of the joint the apron E is very rigidly united to the cross-slide C, and all lost motion avoided.

It will also be seen that any looseness of the parts from wear can be readily taken up by tightening the screws c c.

The tool-apron E projects from its hinged end toward the front part of slide C, where, by means of an adjusting-nut, I, upon a screw, J, it receives its vibrating movement, which gives the vertical adjustment to the turning-tool.

The T-head of adjusting-screw J is held in a corresponding recess in the slide C, and the screw passes through the apron E, the nut I bearing upon the top of the latter, which is in all positions pressed against the nut by the downward-pulling tendency of the cut on the opposite side of the fulcrum, assisted by a stout spring, K, upon the lower side of the apron, thereby avoiding any lost motion at the point of contact between the apron E and adjusting-nut I.

The manner in which the point of the turning-tool is actuated by elevating or depressing the nut I will be readily understood upon referring to Fig. 1. The fulcrum G being situated between the cutting-point and adjusting-nut I, it follows that any movement of the said nut upon its screw J will cause a movement of the cutting-point in the opposite direction; thus, when the nut is elevated, the point of the tool descends and diminishes the diameter of the part being turned, while a depression of the nut I will carry the cutting-point upward, and by thus withdrawing it slightly from the center of rotation, increase the diameter of the piece under cut.

It will be evident from the foregoing description that the vertical adjustment of the tool by my arrangement does not in any way affect the diameter of the piece that will swing over the saddle or bottom rest of the lathe, and in so far is superior to the old method before described; but as the support for the tool is placed nearly over the axis of the hinge on which it is adjusted, the strain of the cut is thrown almost directly upon it, and is transferred to the bed-piece in a direct line by metal in contact with metal, thus giving great steadiness to the cut without making the adjusting-piece clumsy from the quantity of metal required to give it stability, as is the case by the old method, where the cutting-point of the tool is placed between the adjusting-supports.

Having now described my invention and the manner in which the same is used, I wish to be understood as not intending to limit the application of my improvements to the exact position in which they are represented in the drawing, being well aware that the principle of my invention would in no way be affected by modifying its application so as to place the hinge-joint below the cross-slide C, and so producing the vibrating movement for the same purpose at another point in the slide-rest; but—

What I claim as my invention, and desire to secure by Letters Patent, is—

1. The construction of a slide-rest for lathes, wherein the cutting-tool, in addition to the usual movements in a horizontal plane, has also a vertical adjustment, when this adjustment is made about a fixed center placed between the cutting-point and the adjusting-screw, substantially as described, and for the purpose specified.

2. The described method of forming a hinged joint for the purpose of giving vertical adjustment to the turning-tool by the employment of a block, H, and pin G, when constructed and arranged in connection with the other parts of the rest, substantially as and for the purpose described.

WM. SELLERS.

Witnesses:
 JOS. B. HOUGH,
 OLIVER HOUGH.